United States Patent [19]

Inoue

[11] Patent Number: 5,486,589
[45] Date of Patent: Jan. 23, 1996

[54] ROOM TEMPERATURE VULCANIZABLE ORGANOPOLYSILOXANE COMPOSITION

[75] Inventor: Yoshio Inoue, Annaka, Japan

[73] Assignee: Shin-Etsu Chemical Co., Ltd., Tokyo, Japan

[21] Appl. No.: 355,771

[22] Filed: Dec. 14, 1994

[30] Foreign Application Priority Data

Dec. 14, 1993 [JP] Japan ................................. 5-342451

[51] Int. Cl.$^6$ .................................................. C08G 77/08
[52] U.S. Cl. ................................ 528/17; 528/18; 528/21; 528/22; 528/32; 528/33; 528/34
[58] Field of Search ................................. 528/33, 34, 18, 528/17, 21, 22, 32, 38

[56] References Cited

U.S. PATENT DOCUMENTS 4,960,847  10/1990  Arai et al. ................................. 528/34

OTHER PUBLICATIONS

Japanese Industrial Standard, K6301–1975 (reaffirmed: 1983).

Japanese Industrial Standard, A5758–1992.

*Primary Examiner*—Melvyn I. Marquis
*Attorney, Agent, or Firm*—Lowe, Price, LeBlanc & Becker

[57] ABSTRACT

A room temperature vulcanizable composition comprises a diorganopolysiloxane blocked with a silanol group at both ends of the molecular chain, an organopolysiloxane having at least three silanol groups in the molecule, and at least one member selected from the group consisting of organosilanes and organopolysiloxanes each having two hydrolyzable groups in one molecule. The composition ensures easy control of its working life and is able to yield a cured product having a low modulus over a long time.

5 Claims, No Drawings

ROOM TEMPERATURE VULCANIZABLE ORGANOPOLYSILOXANE COMPOSITION

BACKGROUND OF THE INVENTION

1. Field of The Invention

This invention relates to a room temperature vulcanizable organopolysiloxane composition which is useful as a sealant for buildings.

2. Description of the Prior Art

One pack-type room temperature vulcanizable (hereinafter sometimes referred to simply as RTV) organopolysiloxane compositions are in general-purpose use in the electric and electronic fields and also in building fields. This is because they have advantages in that the compositions are vulcanized, by the action of moisture in air, by merely pushing out from tubes or cartridge-type containers and are thus easy in use and that the compositions are unlikely to corrode electric and electronic parts therewith.

Since silicone-based sealants and adhesives exhibit good weatherability, adhesiveness, durability and the like properties, the RTV organopolysiloxane composition has wide utility in the field of buildings for waterproofing of metal curtain walls, concrete curtain walls, aluminum sashes, ALC (autoclaved lightweight concrete) panels, glass window frames and the like which are ordinarily used as outer walls of buildings and also as airtight sealants and adhesives for various types of building materials. Especially, when the composition is applied as a waterproof sealant, there is a demand for the composition which is able to follow up a stress which would be imposed thereon owing to the difference in temperature, wind or earthquake.

For instance, usual practice is to use a low modulus sealant as a joint sealing material for buildings having great movements. Known low modulus sealants include, for example, those which make use of bifunctional organosilanes or organosiloxanes having two hydrolyzable groups and trifunctional or higher functionality-bearing organosilanes or organosiloxanes having three or more hydrolyzable groups, with which diorganopolysiloxanes having a silanol group at both ends of the molecular chain are cured. However, such a low modulus sealant as set out above has a difficulty in stabilizing the physical properties after curing. Especially, it is difficult to stably keep the low modulus over a long time. Further, the reactivity of the hydrolyzable groups of the trifunctional or higher functionality-bearing organosilane or organosiloxane is greater than that of the hydrolyzable groups of the bifunctional organosilane or organosiloxane. Eventually, the curing reaction of the trifunctional or higher functionality-bearing organosilanes or organosiloxanes proceeds more rapidly. This involves a great difficulty in properly controlling the working life of two-component sealants, thus requiring to overcome this difficulty in use.

SUMMARY OF THE INVENTION

It is accordingly an object of the invention to provide a room temperature vulcanizable organopolysiloxane composition which overcomes the disadvantages or difficulties involved in the prior art counterparts.

It is another object of the invention to provide a room temperature vulcanizable organopolysiloxane composition whose working life can be readily controlled and which is able to provide a cured product having a low modulus over a long time.

The above objects can be achieved, according to the invention, by a room temperature vulcanizable composition which comprises:

(A) 100 parts by weight of a diorganopolysiloxane blocked with a silanol group at both ends of the molecular chain;

(B) from 0.01 to 10 parts by weight of an organopolysiloxane having at least three silanol groups in the molecule; and (C) from 0.5 to 30 parts by weight of at least one member selected from the group consisting of organosilanes and organopolysiloxanes each having two hydrolyzable groups in one molecule.

DETAILED DESCRIPTION OF THE INVENTION

The respective essential ingredients (A) to (C) used in the composition of the invention are described in detail.

Ingredient (A)

The ingredient (A) is a diorganopolysiloxane blocked with a silanol group at both ends of the molecule. Such a diorganopolysiloxane can be represented, for example, by the following general formula (1)

$$HO[(R^1)(R^2)SiO]_nH \tag{1}$$

wherein $R^1$ and $R^2$ may be the same or different and independently represent an unsubstituted or substituted monovalent hydrocarbon group selected from an alkyl group having from 1 to 8 carbon atoms, an alkenyl group having from 2 to 3 carbon atoms, an aryl group having from 6 to 8 carbon atoms, a cycloalkyl group having from 5 to 7 carbon atoms, and those groups mentioned above and substituted with a halogen atom, a cyano group or the like at part or all of the hydrogen atoms bonded to the carbon atoms thereof, and n is an integer of 5 or over. The alkyl groups include, for example, a methyl group, an ethyl group, a propyl group and the like, and the alkenyl groups include a vinyl group and an allyl group. Examples of the aryl group include a phenyl group, a tolyl group and the like. Likewise, examples of the cycloalkyl group include a cyclohexyl group. The halogens include, for example, chlorine, fluorine, iodine and bromine. Specific examples of the substituted monovalent hydrocarbon include a trifluoropropyl group and the like.

The ingredient (A) has a viscosity at 25° C. of from 25 to 500,000 centistokes, preferably from 1,000 to 100,000 centistokes.

Ingredient (B)

The organopolysiloxanes of the ingredient (B) may have a linear, branched or cyclic siloxane structure and should have at least three silanol groups in the molecule. Examples of such organopolysiloxanes include those of the following general formulas $HO[(R)_2SiO)]_m[(R)(OH)SiO]_k[(R)_2SiO]H$, $(R)_3SiO[(R)_2SiO)]_m[(R)(OH)SiO]_k[(R)_2SiO]Si(R)_3$, and

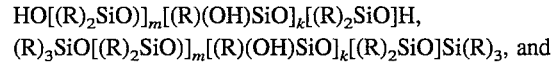

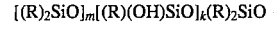

wherein R's may be the same or different and independently represent an unsubstituted or substituted monovalent hydrocarbon group, k is an integer of 3 or over, and m is an integer of 1 or over. The value of m+n is not critical and, in view of the convenience in industrial use, a range of m+k≦100 is preferred. More preferably, a range of m+k≦50 is used.

The unsubstituted or substituted monovalent hydrocarbon groups represented by R's may be those defined with respect to $R^1$ and $R^2$ of the formula (1), from which the cycloalkyl group is omitted. Examples of the monovalent hydrocarbon groups include an alkyl group such as a methyl group, an ethyl group, a propyl group or the like, an aryl group such as a phenyl group, a tolyl group or the like, an alkenyl group such as a vinyl group, an allyl group or the like, and those groups mentioned above and substituted at part or all of the hydrogen atoms bonded to the carbon atoms thereof with a halogen atom or a cyano group.

The amount of the ingredient (B) is in the range of from 0.01 to 10 parts by weight, preferably from 0.1 to 5 parts by weight, per 100 parts by weight of the ingredient (A). If the amount of the ingredient (B) is less than 0.01 parts by weight, the resultant cured product inconveniently becomes so low in modulus that curing failure may take place, with the possibility of not showing rubber elasticity. When the amount exceeds 100 parts by weight, the composition after curing exhibits too high a modulus and thus, becomes too hard.

Ingredient (C).

The ingredient (C) is at least one member selected from organosilanes and organopolysiloxanes both of which have at least two hydrolyzable groups in the molecule. This ingredient is important and serves to crosslink the ingredients (A) and (B) therebetween.

The hydrolyzable groups of the organosilanes and organopolysiloxanes of the ingredient (C) include: an alkoxyl groups having from 1 to 4 carbon atoms such as a methoxy group, an ethoxy group, a propenoxy group and the like; an acyloxy group having from 2 to 8 carbon atoms such as an acetoxy group; a ketoxime group having from 3 to 8 carbon atoms such as a methylethylketoxime group; a dialkylamino group having from 2 to 4 carbon atoms such as a dimethylamino group, a diethylamino group, a di-n-butylamino group or the like; an amide group such as an N-ethylacetamide; an aminoxy group such as a diethylaminoxy group; and a group of the formula, $-OC(CH_3)=CHCOOR^3$ wherein $R^3$ represents an alkyl group having from 1 to 3 carbon atoms such as a methyl group, an ethyl group or the like. Of these, the dialkylamino group, aminoxy group, amide group and $-OC(CH_3)=CHCOOR^3$ group are preferred in view of their high reactivity with the silanol groups. In this connection, however, if the hydrolyzable group is relatively low in the reactivity, a curing catalyst may be used, in combination, for achieving the purpose of the invention.

The orgaosilanes or organopolysiloxanes of the ingredient (C) may have, aside from the above-stated hydrolyzable groups, an unsubstituted or substituted monovalent hydrocarbon group. Examples of the monovalent hydrocarbon group include an alkyl group, an aryl group and an alkenyl group with or without substitution with a halogen atom or a cyano group at part or all of the hydrogen atoms bonded to the carbon atoms. These alkyl, aryl and alkenyl groups are similar to those defined in the foregoing formulas including the formula (1). The substituted group includes, for example, a trifluoropropyl group.

Examples of the organosilanes of the ingredient (C) include dimethyldimethoxysilane, dimethyldiacetoxysilane, methyldipropenoxysilane, dimethylbis(methyl ethylketoxime), methylvinylbis(methylethylketoxime )silane, dimethylbis(dimethylamino )silane, dimethylbis(diethylamino)silane, dimethylbis(di-n-butylamino)silane, methylvinylbis(di-n-butylamino)silane, methyltrifluoropropylbis(ethylamino)silane, methylvinylbis(dimethylamino)silane, dimethylbis(N-ethylacetamido)silane, methylvinylbis(N-ethylacetamido)silane,
$(CH_3)_2Si(OCCH_3=CHCOOCH_3)_2$,
$(CH_3)_2Si(OCCH_3=CHCOOCH_2CH_3)_2$,
$CH_3(CH_2=CH)Si(OCCH_3=CHCOOCH_3)_2$,
$CH_3(CH_2=CH)Si(OCCH_3=CHCOOCH_2CH_3)_2$, $$\overline{(Me_2SiO)_2[(Me)(Et_2NO)SiO]_2}$$

$$\overline{(MePrSiO)_2[(Me)(Et_2NO)SiO]_2}$$

wherein Me represents a methyl group, Et represents an ethyl group, and Pr represents a propyl group.

The organopolysiloxane as the ingredient (C) may have a linear, branched or cyclic structure.

The amount of the ingredient (C) is generally in the range of from 0.5 to 30 parts by weight, preferably from 1 to 15 parts by weight, per 100 parts by weight of the ingredient (A). If the amount of the ingredient (C) is less than 0.5 parts by weight, curing failure takes place, so that a rubber elastomer cannot be obtained. When the amount exceeds 30 parts by weight, the curing proceeds very slowly with poor economy.

Other Ingredients

If necessary, the composition of the invention may further comprise a curing catalyst ordinarily employed for this purpose. The catalysts include tin carboxylates such as tin naphthenate, tin caprylate, tin oleate and the like, tin compounds such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, dibutyltin benzylmaleate and the like, and titanates and titanium chelate compounds such as tetraethoxy titanium, tetraisopropoxy titanium, tetra-n-butoxy titanium, tetrakis( 2-ethylhexoxy)titanium, dipropoxybis(acetylacetonato )titanium, titanium isopropoxyoctylene glycol and the like.

If the curing catalyst is employed, the amount of the catalyst is generally, in the range of 0.01 to 5 parts by weight, preferably from 0.1 to 1 part by weight, per 100 parts by weight of the ingredient (A).

In order to enhance the activity of the curing catalyst, basic compounds may be used in combination. Such basic compounds include amines such as octylamine, laurylamine and the like, strongly basic cyclic amidines such as imidazoline, tetrahydropyrimidine, 1,8odiaza-bicyclo(5,4,0)undecene-7 (DBU), guanidine and the like, and guanidyl group-containing silanes, partial hydrolyzates thereof and guanidyl group-containing siloxanes such as tetraguanidylpropyltrimethoxysilane, tetramethylguanidylpropyldimethoxysilane, tetramethylguanidylpropyltris(trimethylsiloxy)silane and the like. If present, the basic compound is used in an amount of from 0.1 to 10 parts by weight per 100 parts by weight of the ingredient (A).

The composition of the invention may further comprise, if necessary, fillers in order to reinforce and extend the composition or to impart thixotropic properties to the composition. The fillers may be any known ones and include, for example, finely divided silica powders such as fumed silica, calcined silica, precipitated silica, ground silica and fused silica powders, diatomaceous earth, metal oxides such as iron oxides, zinc oxide, titanium oxides, barium oxide, magnesium oxide and the like, metal carbonates such as calcium carbonate, magnesium carbonate, zinc carbonate and the like, metal hydroxides such as cerium hydroxide, aluminum hydroxide and the like, glass fibers, glass wools, carbon black, finely divided mica, asbestos, spherical silica particles, spherical silsesquioxane powders, and those mentioned above which have been treated with silanes for imparting hydrophobicity thereto.

If necessary, other additives may be optionally added to the composition, including, for example, thixotropy-imparting agents such as polyethylene glycol and derivatives thereof, pigments, dyes, oxidant inhibitors, antioxidants, antistatic agents, flame retarders such as antimony oxide, chlorinated paraffins and the like, and thermal conductivity improvers such as boron nitride, aluminum oxide and the like. In addition, adhesion modifiers may be further added including, for example, organosilicon compounds or so-called silane coupling agents having a reactive organic group or groups such as an amino group, an epoxy group, a mercapto group and the like.

When the composition of the invention is applied to a substrate, the composition may be diluted, in view of the convenience in handling, with hydrocarbon solvents such as toluene, xylene, petroleum ether and the like, ketones, esters and the like. Moreover, there may be further added plasticizers, anti-sagging agent, known stainproofing agents, preservatives, bactericides or germicides, moldproofing agents and the like.

The present invention is described by way of examples. A comparative example is also shown. For the preparation of compositions in the examples and the comparative example, the following ingredients (a) to (C) were used.

Ingredient (A)

Dimethylpolysiloxane having a viscosity o 20,000 centistokes at 25° C. and a silanol group at both ends thereof.

Ingredient (B)

Organopolysiloxane of the following formula having five silanol groups and blocked with a trimethylsilyl group at both ends thereof Me$_3$SiO(Me$_2$SiO)$_{10}$(MeSi(OH)O)$_5$SiMe$_3$ wherein Me represents a methyl group.

Ingredients (C)

(1) Methylvinylbis(N-ethylacetamido)silane (2) Dimethylbis(diethylamino)silane (3) Cyclotetrasiloxane of the following formula

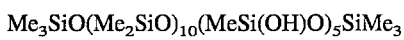

wherein Me represents a methyl group, Pr represents a propyl group, and Et represents an ethyl group.

(4) Cyclotetrasiloxane of the following formula

wherein Me represents a methyl group, Pr represents a propyl group, and Et represents an ethyl group.

Example 1

100 parts by weight of calcium carbonate was added to 100 parts by weight of the ingredient (A), followed by mixing by means of a three roll mill to obtain a base compound. 0.5 parts by weight of the ingredient (B) was added to 100 parts by weight of the base compound, followed by further addition of 3 parts by weight of the above compound (2) as the ingredients (C) and mixing.

The resultant composition was subjected to measurement of a working life according to the method described in JIS A 5758. The results are shown in Table 1.

The composition was formed into a 2 mm thick sheet and cured under conditions of a temperature of 25° C. and a humidity of 55% for 7 days. The resulting cured sheet was subjected to measurements of hardness, tensile strength, elongation and 150% modulus according to the methods described in JIS K 630 1. The results are also shown in Table 1.

Moreover, the cured sheet was further subjected to measurement of 150% modulus one year after outdoor weathering thereof, with the results shown in Table 1.

Examples 2 to 6 and Comparative Example 1

The general procedure of Example 1 was repeated using the ingredients (A) to (C) and calcium carbonate in amounts indicated in Table 1, thereby obtaining compositions of the respective examples and the comparative example.

Each composition was subjected to measurement of a working life according to the method described in JIS A 5758.

Each composition was formed into a cured sheet in the same manner as in Example 1 and the cured sheet was subjected to measurements of hardness, tensile strength, elongation and 150% modulus in the same manner as in Example 1, with the results shown in Table 1.

The cured sheet was further subjected to measurement of 150% modulus one year after outdoor weathering thereof, with the results shown in Table 1.

TABLE 1

|  | Ex. 1 | Ex. 2 | Ex. 3 | Ex. 4 | Ex. 5 | Ex. 6 | Comp. Ex. 1 |
|---|---|---|---|---|---|---|---|
| Composition: | | | | | | | |
| Ingredient (A) (parts by weight) | 50 | 50 | 50 | 50 | 50 | 50 | 50 |
| Ingredient (B) (parts by weight) | 0.5 | 0.3 | 1.0 | 0.5 | 0.2 | 0.5 | — |
| Ingredient (C) (parts by weight): | | | | | | | |
| (1) | 3 | 2 | 5 | — | — | — | 3 |
| (2) | — | — | — | 10 | — | — | — |
| (3) | — | — | — | — | 2 | 3 | — |
| (4) | — | — | — | — | — | — | 0.2 |
| Calcium carbonate (parts by weight) | 50 | 50 | 50 | 50 | 50 | 50 | 50 |
| Working life (hours) | 9 | 7 | 11 | 14 | 8 | 10 | 4 |
| Physical Properties: | | | | | | | |
| Hardness* | 21 | 18 | 25 | 23 | 20 | 24 | 22 |
| Tensile Str. (Kgf/cm$^2$) | 18 | 17 | 23 | 20 | 15 | 21 | 18 |
| Elongation (%) | 1000 | 1100 | 800 | 900 | 1400 | 850 | 1100 |
| 150% Modulus (Kgf/cm$^2$) | 2.1 | 1.9 | 2.4 | 2.2 | 1.6 | 2.2 | 2.0 |
| 150% Modulus After One Year (Kgf/cm$^2$) | 2.2 | 2.0 | 2.5 | 2.3 | 1.7 | 2.3 | 2.8 |

Note: The hardness was determined by use of the spring hardness tester (type A) described in JIS K 6301.

As will be apparent from the results of Table 1, the compositions of the invention are easy in controlling the working life and are stable over a long time while keeping a low modulus when cured. Accordingly, the composition of the invention is useful as a joint sealant for buildings with a great movement, particularly, as a sealant for use in high-rise buildings or skyscrapers.

What is claimed is:

1. A room temperature vulcanizable composition which comprises:

(A) 100 parts by weight of a diorganopolysiloxane blocked with a silanol group at both ends of the molecular chain, said diorganopolysiloxane being of the following formula $$HO[(R^1)(R^2)SiO]_nH$$

wherein each of $R^1$ and $R^2$ independently represents an unsubstituted or substituted monovalent hydrocarbon group selected from a $C_{1-8}$ alkyl group, a $C_{2-3}$ alkenyl group, a $C_{6-8}$ aryl group, a $C_{5-7}$ cycloalkyl group or those groups defined above substituted with a halogen atom or cyano group for one to all of the hydrogen atoms bonded to the carbon atoms thereof, and n is an integer of 5 or more;

(B) from 0.01 to 10 parts by weight of an organopolysiloxane having at least three silanol groups in the molecule, and is of the following formula $$R^3O[(R)_2SiO]_m[(R/(OH)SiO]_k[(R)_2SiO]R^3$$

wherein each R independently represents an unsubstituted or substituted monovalent hydrocarbon group selected from a $C_{1-8}$ alkyl group, a $C_{2-3}$ alkenyl group, a $C_{6-8}$ aryl group or those groups defined above substituted with a halogen or cyano group for one to all of the hydrogen atoms bonded to the carbon atoms thereof, both $R^3$ are hydrogen atoms or the group $(R)_3Si$, k is an integer of 3 or over, and m is an integer of 1 or over; and (C) from 0.5 to 30 parts by weight of at least one member selected from the group consisting of organosilanes and organopolysiloxanes each having two hydrolyzable groups in one molecule, the at least one member serving to crosslink said diorganopolysiloxane and said organopolysiloxane therethrough.

2. A room temperature vulcanizable composition according to claim 1, wherein said at least two hydrolyzable groups of said at least one member each consists of a dialkylamino group, an aminoxy group, an amide group or a —$OC(CH_3)$=$CHCOOR^3$ wherein $R^3$ represents a lower alkyl group having from 1 to 3 carbon atoms.

3. A room temperature vulcanizable composition according to claim 1, further comprising from 0.01 to 5 parts by weight a curing catalyst for said diorganopolysiloxane and said organopolysiloxane.

4. A room temperature vulcanizable composition according to claim 3, further comprising a basic compound for enhancing the catalytic activity of said curing catalyst.

5. A cured product of the composition defined in claim 1.

* * * * *